(12) United States Patent
Childers

(10) Patent No.: US 7,148,933 B2
(45) Date of Patent: Dec. 12, 2006

(54) PROJECTOR HAVING ALIGNMENT OPTICS AND ELECTRONICS

(75) Inventor: Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 723 days.

(21) Appl. No.: 10/349,047

(22) Filed: Jan. 21, 2003

(65) Prior Publication Data

US 2003/0206249 A1 Nov. 6, 2003

Related U.S. Application Data

(63) Continuation-in-part of application No. 10/309,425, filed on Dec. 3, 2002, and a continuation-in-part of application No. 10/138,765, filed on May 3, 2002.

(51) Int. Cl.
*H04N 3/22* (2006.01)
*H04N 3/26* (2006.01)

(52) U.S. Cl. ........................ 348/745; 348/615

(58) Field of Classification Search ........ 348/745–746, 348/806, 807, 808, 181, 189, 190, 191, 615, 348/616
See application file for complete search history.

(56) References Cited

U.S. PATENT DOCUMENTS

| | | | | | |
|---|---|---|---|---|---|
| 4,684,996 | A | * | 8/1987 | Baumeister | 348/747 |
| 5,231,481 | A | * | 7/1993 | Eouzan et al. | 348/658 |
| 5,475,447 | A | * | 12/1995 | Funado | 348/745 |
| 5,614,961 | A | * | 3/1997 | Gibeau et al. | 348/750 |
| 5,715,021 | A | | 2/1998 | Gibeau et al. | |
| 5,818,546 | A | | 10/1998 | Opower et al. | |

\* cited by examiner

*Primary Examiner*—Michael H. Lee

(57) ABSTRACT

A projector employing a linear array of light-emitting sources forms a super pixel in the form of a plurality of beams that are focused onto scanning optics that cause the beams to move across a viewing surface on a first axis for defining image lines along the first axis and on a second axis such that super pixel overwrites every addressable spot on the viewing surface thereby producing interleaved and staggered scan patterns that hide the effect of burned out, misdirected, or marginally operating light-emitting sources that would otherwise result in a degraded projected image. An alignment system that includes alignment electronics that is responsive to a charge-coupled device facilitate adjusting the scanning optics to allow precise alignment of individual ones of the light-emitting sources and to detect burnt out individual ones of the light-emitting sources.

15 Claims, 5 Drawing Sheets

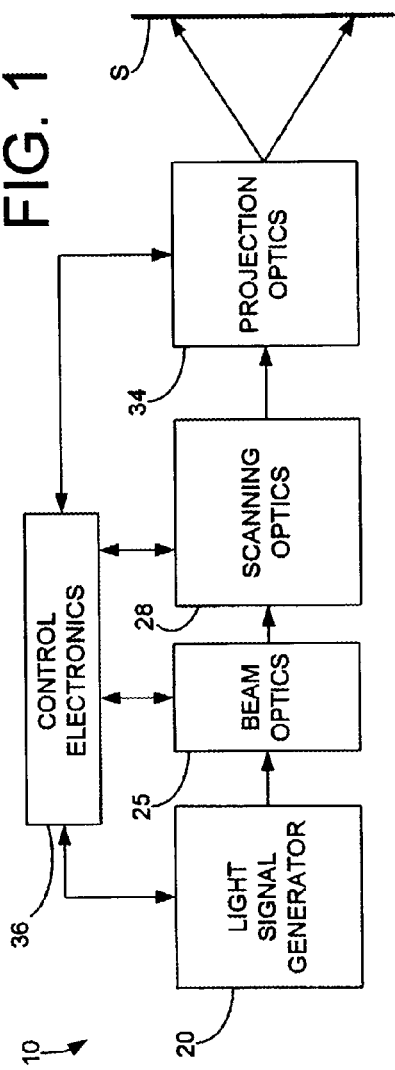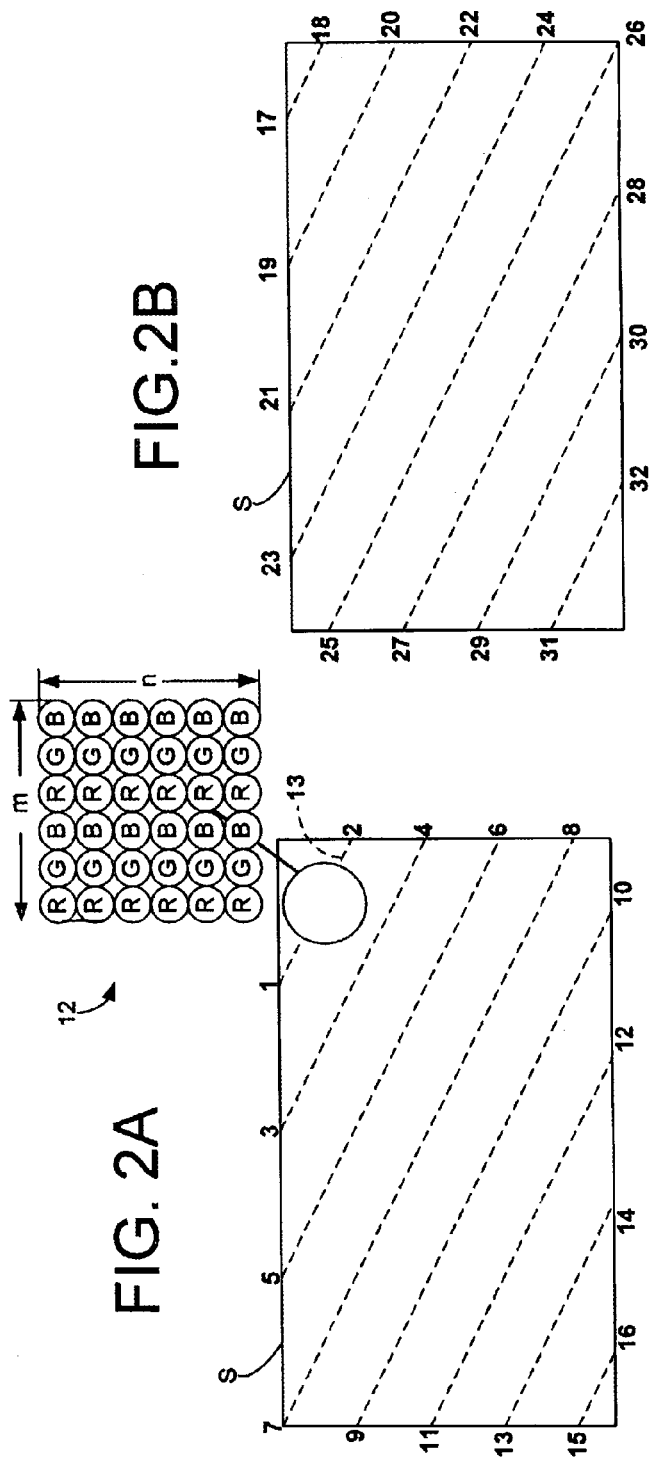

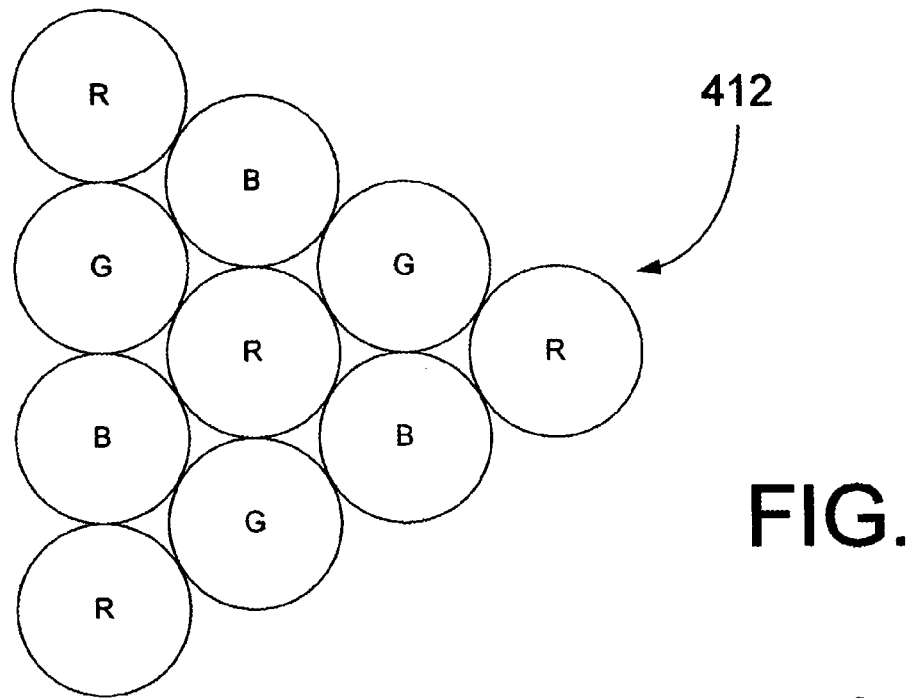
FIG. 6
FIG. 7
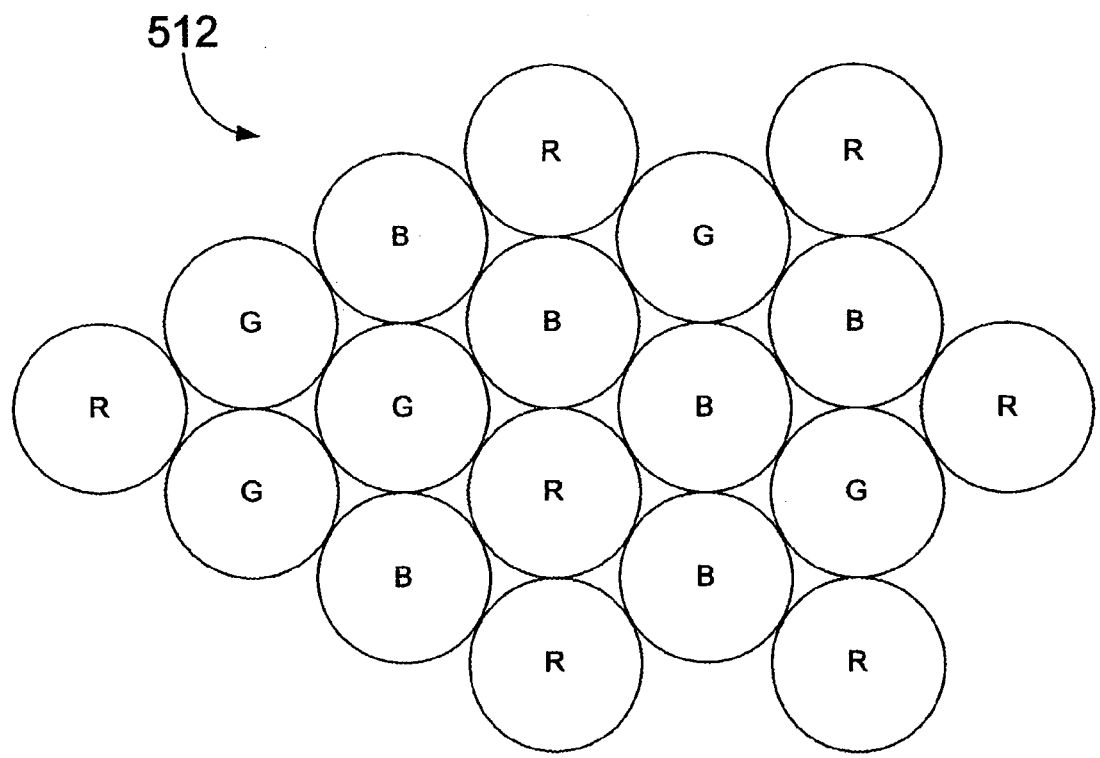

PROJECTOR HAVING ALIGNMENT OPTICS AND ELECTRONICS

RELATED PATENT APPLICATIONS

This is a continuation-in-part application of U.S. patent application Ser. No. 10/309,425, Entitled "Projector Having Scanning Optics", by Winthrop Childers, filed on Dec. 3, 2002, and a continuation-in-part application of U.S. patent application Ser. No. 10/138,765, Entitled "Projector Having Scanning Optics", by Winthrop Childers, filed on May 3, 2002.

BACKGROUND OF THE INVENTION

Projectors utilizing either transmissive or reflective spatial light modulators are well known in the prior art. However, projectors that utilize transmissive spatial light modulators generally produce dim images due to projected light having to travel through the spatial light modulator, while projectors that utilize reflective spatial light modulators are expensive and thus, they do not enjoy widespread community usage.

In the above referenced continuation-in-part application Ser. No. 10/138,765 new and improved projector is disclosed that eliminates the need of a spatial light modulator and thus, is able to generate bright images at a relatively low cost. In this regard, the new and improved projector employs scanning optics where a number of light-emitting sources have their intensities varied in accordance with an image. The scanning optics scan the light output by the light-emitting sources to cover a two-dimensional plane in accordance with an image. While such a projector is a significant improvement over the prior art spatial light modulator projectors, resulting images can be seriously degraded through burned out, misdirected, or marginally operating light-emitting sources. For these and other reasons therefore, there is a need for the present invention.

SUMMARY OF THE INVENTION

In a first preferred embodiment a projector casts an image onto a viewing surface area defined by a matrix array of M by N individually addressable pixel locations. The projector includes a light engine that generates a super pixel defined by a m by n matrix array of individual ones of a plurality of light beams and a scanning arrangement that causes the light beams to form a super pixel dot of light that overwrites every individual one of the addressable pixel locations on the viewing surface area. In this manner, the effect of burnt out ones of the individual light emitting sources that provide the plurality of light beams is obscured or hide in a reduced intensity super pixel dot of light.

In a second preferred embodiment of the present invention the projector includes sensor and computational electronics that receive signals from the light-emitting sources and generate and store alignment information to provide relative alignment between individual ones of the plurality of beams on each addressable spot on the viewing surface. In this preferred embodiment a light engine generates a super pixel having a triangular shape defined by an array of individual ones of a plurality of light beams.

In a third preferred embodiment of the present invention a projector casts an image onto a viewing surface area of any predetermined shape having a plurality of individually addressable pixel locations. The projector includes a light engine that generates a super pixel having an irregular shape defined by an array of individual ones of a plurality of light beams and a scanning arrangement that causes the light beams to form a super pixel dot of light that overwrites every individual one of the addressable pixel locations on the viewing surface area. In this preferred embodiment the sensor and computational electronics are part of a factory alignment system that helps to characterize the projector and then store the characteristic information in projector control electronics.

BRIEF DESCRIPTION OF THE DRAWINGS

The above-mentioned features of this invention and the manner of attaining them will become apparent, and the invention itself will be best understood by reference to the following description of the embodiment of the invention in conjunction with the accompanying drawings wherein:

FIG. 1 is a block diagram of a projector, which is constructed in accordance with the present invention;

FIGS. 2A–B is a diagrammatic representation of the scan progression of a super pixel generated by the projector of FIG. 1;

FIG. 6 is a diagrammatic illustration of a super pixel generated by the projector of FIG. 4; and FIG. 7 is a diagrammatic illustration of another super pixel generated by the projector of FIG. 5.

DETAILED DESCRIPTION OF THE PREFERRED EMBODIMENT

First Preferred Embodiment

Figure 3:
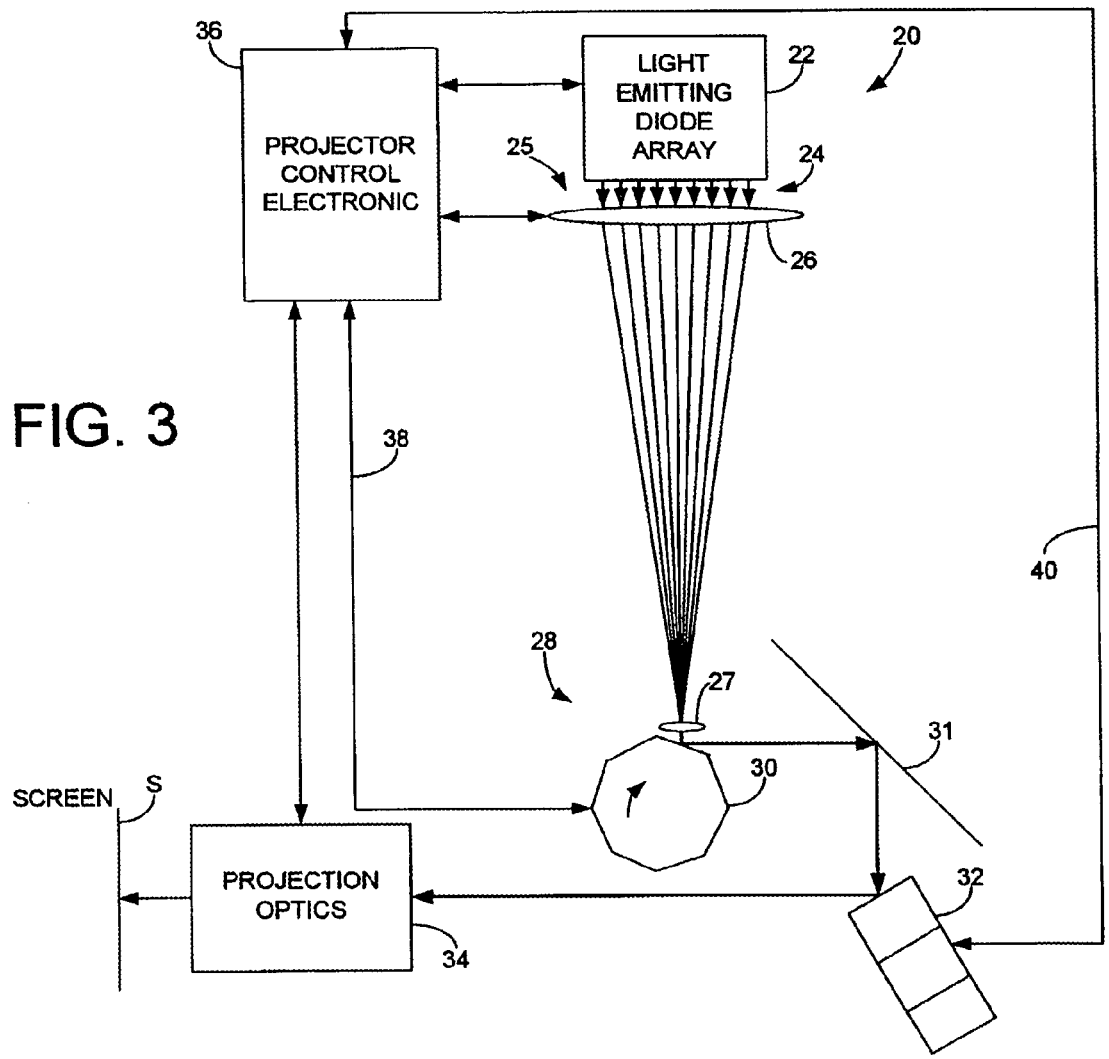
FIG. 3 is a schematic representation of the projector of FIG. 1 illustrating its light signal generator and scanning optics.

Referring now to the drawings and more particularly to FIGS. 1–2 thereof, there is illustrated a projector 10, which is constructed in accordance with one embodiment of the present invention. The projector 10 as will be explained hereinafter in greater detail, generates a super pixel, indicated generally at 12, to produce a spot on a viewing surface area or screen S. The viewing surface area S is defined by an M by N matrix array of individually addressable pixel locations. The projector 10 causes the super pixel 12 to be repetitively sweep across every addressable location on the viewing surface area S in interleaved and staggered scan patterns that effectively hide the effect of burned out, misdirected, or marginally operating light-emitting sources that would otherwise result in a degraded projected image.

Considering now the projector 10 in greater detail with respect to FIG. 1, the projector 10 generally includes projection optics 34 that throws, casts or projects the super pixel 12 onto the viewing screen S in response to scanning optics 28 that facilitate both horizontal scanning and vertical scanning as will be described hereinafter in greater detail. Both the projection optics 34 and the scanning optics 28 are controlled by projector control electronics in the form of an image or projection controller 36. In order to produce the super pixel 12, the projector further includes a light engine or light signal generator 20 and beam optics 25 that are also controlled by the projector controller 36.

As best seen in FIG. 3, the light signal generator 20 having a plurality of light emitting sources 22, such as an m by n array of light emitting diodes, produces a plurality of collimated light beams 24. The light-emitting source 22 in response to image control signals from the projection controller 36 produces the plurality of collimated light beams 24 that form either a still image or a moving image on the viewing area screen S. The light emitting diode array 22 generally includes a plurality of light emitting diodes arranged in a matrix array of m by n light emitting diodes, such as a 6 by 6 matrix array, that produce the plurality of collimated light beams indicated generally at 24. Such an array can be constructed from full color light emitting diodes manufactured and sold by Teledyne Electronic Technologies of Los Angeles, Calif. identified as UB101M-1R, 1G, 1B with different degrees of luminance ranging between about 520,000 fL to about 110,000 fL. Other diodes are available from companies such as LUMILED of San Jose, Calif.

Although the super pixel 12 is illustratively depicted as being an n by m or a 6 by 6 array of spots, other patterns are possible. As a first example, the superpixel might be circular, with a hexagonal close packed arrangement of spots. In a second example, the superpixel may have overlapping, overlaying, or irregularly spaced or arranged spots without departing from the scope or advantages realized by the invention. Additionally, the light source array or light emitting diode array 22 need not have the same geometric configuration that the superpixel array has since optics between the light source array and the superpixel array can be used to re-route light signals from the light sources. Such optics can include components such as waveguides, optical fibers, dichroic mirrors, prisms, condensing lenses, etc.

Although in the first preferred embodiment of the present invention the light-emitting source is described as a light emitting diode array 22, it should be understood by those skilled in the art that other light-emitting sources such as laser diodes, or high luminance emitting devices can also be employed. Moreover, although in the preferred embodiment of the present invention the matrix array is described as a 6 by 6 matrix array, it is contemplated that the matrix array could correspond to the pixel resolution of the viewing screen or any smaller array including a 1 by 3 matrix array. In this regard, there is no intention of limiting the present invention to the described 6 by 6 matrix array but instead the array is more properly described in the general as an m by n matrix array.

The projector controller 36 in response to an image source (not shown) such as a high definition television signal, a computer signal, a video device signal, and the like, turns the individual light emitting diodes in the diode array 22 on and off to produce a desired full colored image. In this regard, the diode array 22 is made up of red-light emitting diodes, green-light emitting diodes, and blue light emitting diodes. By varying the on-off cycle of each individual light emitting diode, an intensity gradient of several different intensity levels can be established. In this regard, the projected image that is displayed on the screen S can be a still image or a moving image, either in full color or in black and white.

As best seen in FIG. 3, the collimated light beams 24 produced by the light emitting diode array 22, are intercepted by the beam forming optics 25 to produce a single point super pixel 12. The single point super pixel 12 is focused on scanning optics 28 by the beam forming optics 25 that includes the combination of a converging lens 26 and a collimating lens 27. In this regard the beam forming optics 25 helps in the projection process to generate a desired image that is controlled by the projection controller 36 and thrown on the viewing screen S by projection optics 34. As noted earlier, the projected super pixel 12 under the influence of the scanning optics 28 and the projection optics 34, is repetitively sweep across every addressable location on a viewing screen S in interleaved and staggered scan patterns to repetitively overwrite the two-dimensional viewing screen plane. By overwriting each and every addressable location on the viewing screen S, the projector 10 uniquely hides the effect of burned out, misdirected, or marginally operating light-emitting sources that would otherwise result in a degraded projected image.

The beam forming optics 25 as best seen in FIG. 3, under control of the projector controller 36, cause the plurality of beams 24 generated by the plurality of light emitting sources 22 to be focused in a collimated super pixel spot on the scanning optics 28. The scanning optics 28, under control of the projector controller 36, is structured to cause the super pixel spot to overwrite the entire two-dimensional plane of the viewing surface S and includes a horizontal scanner 30 and a vertical scanner 32.

The horizontal scanner 30 in the first preferred embodiment of the present invention is an x-axis polygon or multifaceted mirror that is mounted for controlled rotational movement under the control of the projector controller 36 as will be described hereinafter in greater detail. The vertical scanner 32 is a y-axis polygon or multifaceted mirror 32 that is also mounted for controlled rotational movement under the control of the projector controller 36.

Other designs are possible for the scanning optics 28. As one example, a combination of a polygon mirror and a galvanometer mirror can result in vertical and horizontal scanning for the super pixel 12. As another example, two galvanometer mirrors could be utilized for horizontal and vertical scanning.

As best seen in FIG. 3, the x-axis polygon mirror 30 is mounted orthogonal to the y-axis polygon mirror 32. A mirror 31 is interposed between the x-axis polygon mirror 30 and the y-axis polygon mirror 32 in order to transfer the single super pixel spot from the x-axis polygon mirror 30 to the y-axis polygon mirror 32. By having two spinning mirrors on orthogonal axes, the super pixel 12 light beam can sweep out a portion of a rectangle as best seen in FIGS. 2A and 2B. In this regard, if a single beam in the super pixel 12 is activated and all the remaining beams in the super pixel 12 are deactivated a single line trace indicated in the form of a dash line 13 traces out a slanted line across the rectangle as it scans. This is an important feature of the present invention since each light beam within the super pixel 12 must overwrite the entire viewing screen S. Thus, if a single light emitting diode within the diode array 22 burns out, this will only cause an overall reduction in the intensity of that color as viewed on the screen. In order to assure that the single beam covers every pixel location on the viewing screen S, the relative angular speeds of the polygon mirrors 30 and 32 must be adjusted to be a non-integer value.

In order to control the rotational speed of the horizontal scanner 30 and the vertical scanner 32, each of the scanner 30 and 32 include encoder devices that generate rotational speed signals that are coupled to the projector controller 36 via two way control lines which include a horizontal scan control line 38 and a vertical scan control line 40. The projector controller 36 reads the encoder signals generated by the individual ones of the polygon mirrors 30 and 32 to determine their rotational speed and then provides a feedback signals that cause the rotational speed to be maintained, increased or decreased to achieve a desired scanning pattern. This is an important feature of the first preferred embodiment of the present invention as the projector controller 36 by controlling the spin speed of the individual mirrors 30 and 32 causes the above-mentioned interleaving patterns for hiding the effect of burned out, misdirected, or marginally operating light-emitting sources that would otherwise result in a degraded projected image. In the first preferred embodiment of the present invention, it should be noted that the spin speeds of the individual mirrors 30 and 32 are not integer multiples of each other and the difference from an integer multiple impacts interleaving.

Note that the interleaving is also determined by the relative number of facets on the mirrors. Use of a different number of facets will affect the optimal relative speed requirements of the two mirrors.

From the foregoing, it should be understood by those skilled in the art that by controlling the spin speed of the polygon mirrors 30 and 32, the super pixel 12 can be controlled to move across the screen S on a first axis and then on a second axis such that the super pixel 12 is repetitively sweep across every addressable location on a viewing screen S in a randomized manner as best seen in FIGS. 2A and 2B. FIGS. 2A and 2B illustrate how the super pixel 12 moves in such a manner to cause a single super pixel dot of light produced by an individual one of said plurality of light emitting sources 22 to overwrite the entire two-dimensional plane of the viewing screen S to produce an image that hides errors due to burned out individual ones of said plurality of light emitting sources. The sweeping action also results in interleaved and staggered scan patterns that further hide the effect of burned out, misdirected, or marginally operating light-emitting sources that would otherwise result in a degraded projected image.

As best seen in FIGS. 2A and 2B, it should be understood by those skilled in the art the designations such as 1, 2, 3, 4, etc indicate where the super pixel 12 to appear, disappear, appear and disappear on the viewing screen S. From this sweeping action it can be seen that the horizontal scanner 30 is displacing the super pixel 12 on the horizontal axis at an x-axis displacement rate that is substantially greater than the vertical scanner 32 is displacing the super pixel 12 on the vertical axis. That is the x-axis displacement rate is substantially greater than the y-axis displacement rate.

Although in the first preferred embodiment of the present invention the horizontal scanner 30 and the vertical scanner 32 are described as spinning polygon mirrors, one skilled in the art will recognize that a variety of other mechanically resonant devices may scan a light beam through a raster pattern. Therefore the detailed description of the preferred embodiment of the present invention is not to be taken in a limiting sense, and the scope of the present invention is defined only by the appended claims.

In order to properly address individual pixel locations on the viewing screen S, the projector controller 36 must control the time on and time off values for each of the light emitting diodes in the diode array 22 relative to the rotational speed of the horizontal scanner 30 and the vertical scanner 32. Various errors affect the relative locations of the pixels and in particular the relative alignment of the light spots generated by the individual diode elements. To take care of these errors, alignment is performed by adjusting the timing of a given spot using a factory alignment procedure that will be described hereinafter in greater detail.

Second Preferred Embodiment

Figure 4:
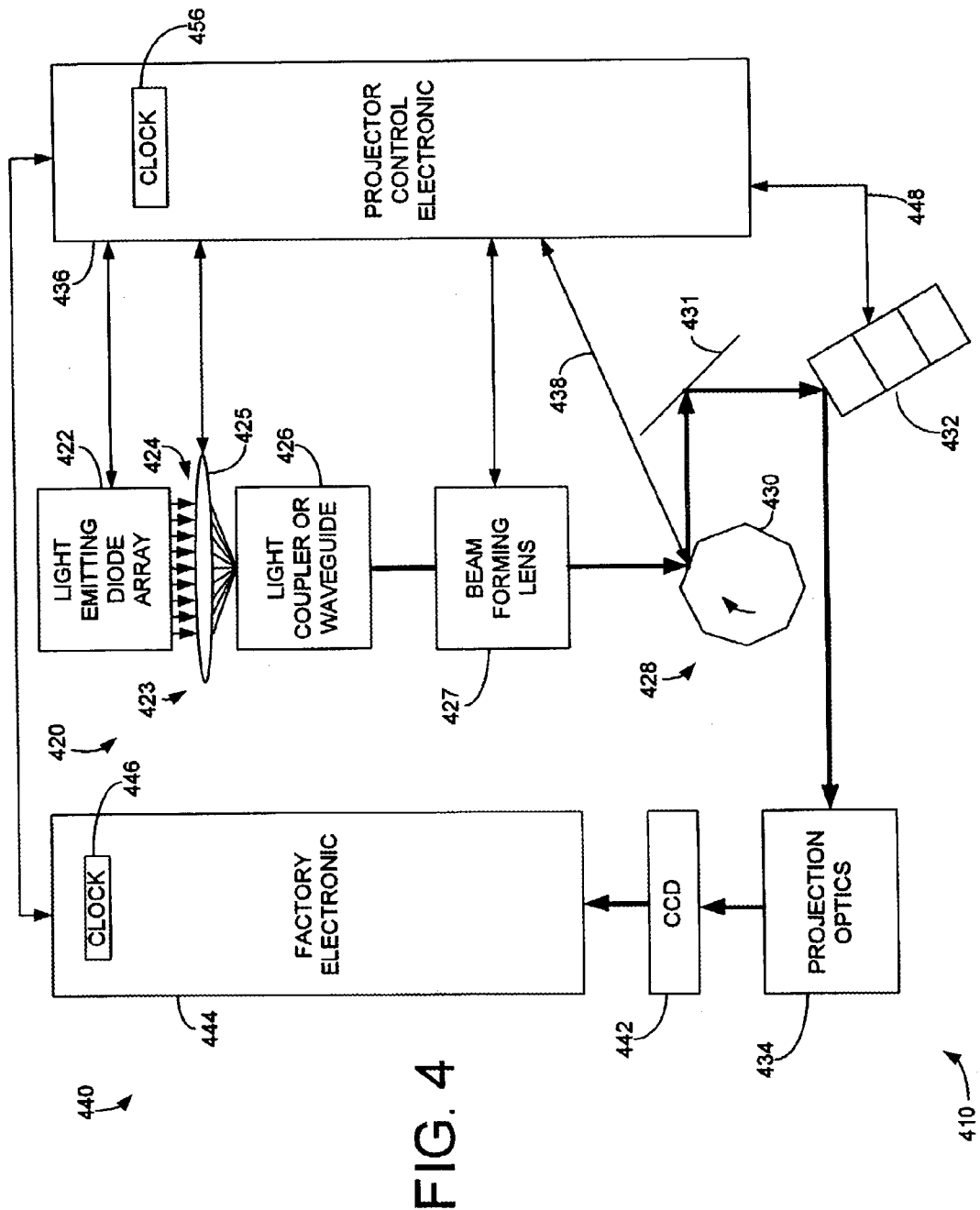
FIG. 4 is a block diagram of another projector, which is constructed in accordance with the present invention.

Referring now to the drawings and more particularly to FIG. 4 thereof, there is illustrated a projector 410, which is constructed in accordance with a second embodiment of the present invention. The projector 410 as will be explained hereinafter in greater detail, generates a triangular super pixel, indicated generally at 412 (FIG. 6), to produce a super pixel spot on a viewing surface or screen S. The super pixel 412 repetitively sweep across every addressable location on a viewing screen S in interleaved and staggered scan patterns thereby hiding the effect of burned out, misdirected, or marginally operating light-emitting sources that would otherwise result in a degraded projected image.

Considering now the projector 410 in greater detail with respect to FIG. 4, the projector 410 generally includes projection optics 434 that throw super pixel 412 onto the viewing screen S in response to scanning optics 428 that facilitates both horizontal scanning and vertical scanning as will be described hereinafter in greater detail. Both the projection optics 434 and the scanning optics 428 are controlled by control electronics in the form of an image or projection controller 436. In order to produce the super pixel 412, the projector 410 further includes a light engine or light signal generator 420 and beam optics 423. The beam optics 423 includes a converging lens 425 and a beam forming collimating lens 427 that are coupled together by a light coupler or waveguide 426. The light signal generator 420 and the beam optics 423 are controlled by the projector controller 436.

The light signal generator 420 is substantially similar to the light signal generator 20 except that it includes a plurality of light sources 422 that are preferably arranged in a triangular array for facilitating the generation of the super pixel 412. As the light signal generator 420 is substantially similar to the light signal generator 20 it will not be described hereinafter in greater detail.

As best seen in FIG. 4, the collimated light beams 424 produced by the plurality of light sources 422, are intercepted by the beam forming optics 423 to produce a single point super pixel 412. The single point super pixel 412 is focused on scanning optics 428 by the combination of a converging lens 425, the light coupler 426 and the collimating lens 427. The beam forming optics 423, under control of the projector controller 436, cause the plurality of beams 424 generated by the plurality of light emitting sources 422 to be focused in a collimated super pixel spot on the scanning optics 428. The scanning optics 428, under control of the projector controller 436, is structured to cause the super pixel spot to overwrite the entire two-dimensional plane of the viewing surface S and includes a horizontal scanner 430 and a vertical scanner 432. The horizontal scanner 430 in the first preferred embodiment of the present invention is an x-axis polygon or multifaceted mirror that is mounted for controlled rotational movement under the control of the projector controller 436 as will be described hereinafter in greater detail. The vertical scanner 432 is a y-axis polygon or multifaceted mirror 432 that is also mounted for controlled rotational movement under the control of the projector controller 436.

The x-axis polygon mirror 430 is mounted orthogonal to the y-axis polygon mirror 432. In order to transfer the single super pixel spot focused on the x-axis polygon mirror 430 to the y-axis spinning polygon mirror 432, the scanning optics 428 also includes a mirror 431. By having two orthogonal axes, the super pixel 412 light beam sweeps out a portion of a rectangle as best seen in FIGS. 2A and 2B. In this regard, if a single beam in the super pixel 412 is activated and all the remaining beams in the super pixel 412 are deactivated a single line trace indicated in the form of a dash line 13 traces out a slanted line across the rectangle as it scans. This is an important feature of the present invention since each light beam within the super pixel 412 must overwrite the entire viewing screen S. Thus, if a single light emitting diode within the plurality of light sources 422 burns out, this will only cause an overall reduction in the intensity of that color as viewed on the screen. In order to assure that the single beam covers every pixel location on the viewing screen S, the relative angular speeds of the polygon mirrors 430 and 432 must be adjusted to be a non-integer value.

In order to control the rotational speed of the horizontal scanner 430 and the vertical scanner 432, each of the scanner 430 and 432 include encoder devices that generate rotational speed signals that are coupled to the projector controller 436 via two way control lines which include a horizontal scan control line 438 and a vertical scan control line 448. The projector controller 34 reads the encoder signals generated by the individual ones of the polygon mirrors 430 and 432 to determine their rotational speed and then provides a feedback signals that cause the rotational speed to be maintained, increased or decreased to achieve a desired scanning pattern. This is an important feature of the first preferred embodiment of the present invention as the projector controller 434 by controlling the spin speed of the individual mirrors 430 and 432 causes the above-mentioned interleaving patterns for hiding the effect of burned out, misdirected, or marginally operating light-emitting sources that would otherwise result in a degraded projected image. In the first preferred embodiment of the present invention, it should be noted that the spin speeds of the individual mirrors 430 and 432 are not integer multiples of each other and the difference from an integer multiple impacts interleaving.

From the foregoing, it should be understood by those skilled in the art that by controlling the spin speed of the polygon mirrors 430 and 432, the super pixel 412 can be controlled to move across the screen S on a first axis and then on a second axis such that the super pixel 412 is repetitively sweep across every addressable location on a viewing screen S in a randomized manner as best seen in FIGS. 2A and 2B. FIGS. 2A and 2B illustrate how the super pixel 412 moves in such a manner to cause a single dot of light produced by an individual one of said plurality of light emitting sources 422 to overwrite the entire two-dimensional plane of the viewing screen S to produce an image that hides errors due to burned out individual ones of said plurality of light emitting sources. The sweeping action also results in interleaved and staggered scan patterns that further hide the effect of burned out, misdirected, or marginally operating light-emitting sources that would otherwise result in a degraded projected image.

In order to properly address individual pixel locations on the viewing screen S, the projector controller 436 must control the time on and time off values for each of the light emitting diodes in the diode array 422 relative to the rotational speed of the horizontal scanner 430 and the vertical scanner 432. Various errors affect the relative locations of the pixels and in particular the relative alignment of the light spots generated by the individual diode elements. To take care of these errors, alignment is performed by adjusting the timing of a given spot using a alignment system indicated generally at 440. The alignment system 440 includes a charge-coupled device 442 that is coupled to factory alignment electronics 444. In order to synchronize the projector 410 with the alignment system 444, the alignment system 440 includes a clock 446 that is coupled to the projector electronics 436 and its associated clock 456. In this regard, the two clocks 446 and 456 are synchronized using a standard synchronization procedure that will not be described hereinafter in greater detail. It will suffice to indicate that the projector clock 456 is the master clock and the alignment system clock 446 is a slave clock.

In order to correct for the various errors mentioned earlier, the projector control electronics 436 includes firmware that provides an indication of when a light beam generated by any individual one of the plurality of light sources 422 should arrive at any one of the addressable pixel locations on the viewing screen S. However, since the viewing screen S is incapable of generating a signal when the light beam illuminates the screen S, the charge-coupled device 442 is positioned to detect the light beam when it illuminates the screen S. In this regard, when the charge-coupled device 442 detects a spot of light provided by the projection optics 434, the charge-coupled device 442 generates a beam detection signal. The beam detection signal is coupled to the alignment electronics 444, which in turn, stores the detection signal in the form of a detection code that includes a header code indicative of a pixel address location that would have otherwise been displayed on the projection screen S and a time code indicative of the time the detection signal was sensed and stored by the alignment electronics 440. The pixel address location is in the form of x and y coordinate values that define each and every pixel location on the screen S.

In response to the alignment electronics 440 storing the detection code, the projector controller 436 retrieves the detection code and compares it with a pre-stored alignment code that is indicative of when the beam of light generated by the projector 410 should have illuminated the addressable pixel location on the screen S. In this regard, the projector controller firmware first checks the x-coordinate values and then the y-coordinate values for alignment. In the first instance if there is a comparison between the x-coordinate values and time values between the two codes, the projector controller firmware proceeds to check the y-coordinate values for alignment. However if there is not a proper comparison between the x-coordinate values and time values, the projector controller 436 determines the differences between the two codes and makes an adjustment to the x-scanner 430 by altering the timing of turning on individual light sources or LEDS.

The projector controller 436 then retrieves a new detection code (for the same predetermined screen location) and repeats the x-coordinate alignment procedure as previously discussed. This is an iterative process until the two codes compare relative to the x-coordinate values and the time values.

Once there is an exact comparison, the firmware in the projector controller 436 proceeds to make a comparison between the y-coordinate values and time values between the two codes. If the projector firmware determines that there is a comparison, the projector controller generates another light beam for another predetermined addressable pixel location on the viewing screen S and then repeats the above described alignment procedure. However if there is not a proper comparison between the y-coordinate values and time values, the projector controller 436 determines the differences between the two codes and makes an adjustment to the y-scanner 432 by altering the timing of turning on individually addressable light sources or LEDS.

The projector controller 436 generates another light beam for the same predetermined addressable pixel location on the viewing screen S. The projector controller 436 then retrieves a new detection code (for the same predetermined screen location) and repeats the y-coordinate alignment procedure as previously discussed. This is an iterative process until the two codes compare relative to the y-coordinate values and the time values.

Once there is a complete comparison between the two codes, the projector controller 436 generates another light beam from an additional individually addressable light source or LED. The above-described procedure is then repeated until relative alignment has been achieved between all of the individually addressable spots that make up the superpixel 412.

It should be understood by those skilled in the art that for each addressable pixel location it is possible to project a light beam for each of the colors red, blue, and green. It is also possible to project a light beam indicative of white light that is formed when all three-color beams are projected simultaneously onto the screen S. The preferred alignment method is to project a light beam indicative of white light when correcting for misalignment and to project a light beam of individual red, green and blue colors when correcting for burnt out light sources. It should also be understood by those skilled in the art that this factory alignment procedure may also be utilized with the projector 10.

Third Preferred Embodiment of the Present Invention

Figure 5:
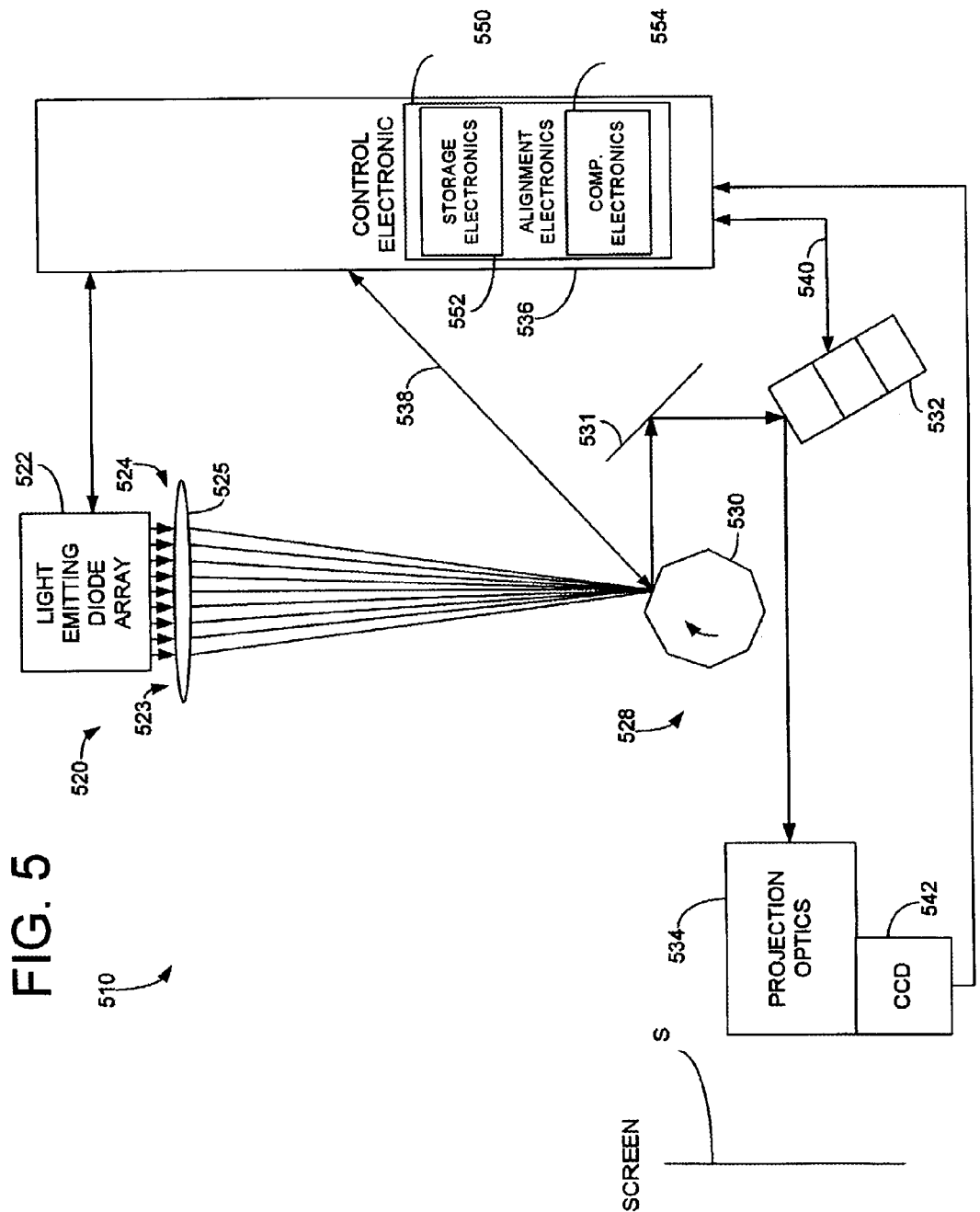
FIG. 5 is a block diagram of yet another projector, which is constructed in accordance with the present invention.

Referring now to the drawings and more particularly to FIG. 5 thereof, there is illustrated a projector 510, which is constructed in accordance with a third embodiment of the present invention. The projector 510 as will be explained hereinafter in greater detail, generates an irregularly shaped super pixel, indicated generally at 512 (FIG. 6), to produce a spot on a viewing surface or screen S. The super pixel 512 repetitively swept across every addressable location on a viewing screen S in interleaved and staggered scan patterns thereby hiding the effect of burned out, misdirected, or marginally operating light-emitting sources that would otherwise result in a degraded projected image.

Considering now the projector 510 in greater detail with respect to FIG. 5, the projector 510 generally includes projection optics 534 that throw or projects the super pixel 512 onto the viewing screen S in response to scanning optics 528 that facilitates both horizontal scanning and vertical scanning as will be described hereinafter in greater detail. Both the projection optics 534 and the scanning optics 528 are controlled by control electronics in the form of an image or projection controller 536. In order to produce the super pixel 512, the projector 510 further includes a light engine or light signal generator 520 and beam optics 523. The beam optics 523 includes a converging lens 525 that is controlled by the projector controller 536 in order to facilitate focusing a converged beam of light indicative of the super pixel on the scanning optics 528.

The light signal generator 520 is substantially similar to the light signal generator 20 except that it includes a plurality of light sources 522 that are arranged in an irregular shaped array for facilitating the generation of the super pixel 512. As the light signal generator 520 is substantially similar to the light signal generator 20, the light signal generator 520 will not be described hereinafter in greater detail.

As best seen in FIG. 5, the collimated light beams 524 produced by the plurality of light sources 522, are intercepted by the beam forming optics 523 to produce a single point super pixel 512. The single point super pixel 512 is focused on scanning optics 528 by a single converging lens 525, which operates under the control of the projector controller 536. The beam forming optics 523, under control of the projector controller 536, cause the plurality of beams 524 generated by the plurality of light emitting sources 522 to be focused in a super pixel spot on the scanning optics 528.

Considering now the scanning optics 528 in greater detail with reference to FIG. 5, the scanning optics 528, under control of the projector controller 536, is structured to cause the super pixel spot to overwrite the entire two-dimensional plane of the viewing surface S and includes a horizontal scanner 530 and a vertical scanner 532. The horizontal scanner 530 is an x-axis polygon or multifaceted mirror that is mounted for controlled rotational movement under the control of the projector controller. The vertical scanner 532 is a y-axis polygon or multifaceted mirror 532 that is also mounted for controlled rotational movement under the control of the projector controller 536.

The x-axis polygon mirror 530 is mounted orthogonal to the y-axis polygon mirror 532. In order to transfer the single super pixel spot focused on the x-axis polygon mirror 530 to the y-axis spinning polygon mirror 532, the scanning optics 528 also includes a mirror 531. By having two orthogonal axes, the super pixel 512 light beam sweeps out a portion of a rectangle as best seen in FIGS. 2A and 2B. In this regard, if a single beam in the super pixel 512 is activated and all the remaining beams in the super pixel 512 are deactivated a single line trace indicated in the form of a dash line 13 traces out a slanted line across the rectangle as it scans. This is an important feature of the present invention since each light beam within the super pixel 512 must overwrite the entire viewing screen S. Thus, if a single light emitting diode within the plurality of light sources 522 burns out, this will only cause an overall reduction in the intensity of that color as viewed on the screen. In order to assure that the single beam covers every pixel location on the viewing screen S, the relative angular speeds of the polygon mirrors 530 and 532 must be adjusted to be a non-integer value.

In order to control the rotational speed of the horizontal scanner 530 and the vertical scanner 532, each of the scanner 530 and 532 include encoder devices that generate rotational speed signals that are coupled to the projector controller 536 via two way control lines which include a horizontal scan control line 538 and a vertical scan control line 540. The projector controller 536 reads the encoder signals generated by the individual ones of the polygon mirrors 530 and 532 to determine their rotational speed and then provides a feedback signals that cause the rotational speed to be maintained, increased or decreased to achieve a desired scanning pattern. This is an important feature of the third preferred embodiment of the present invention as the projector controller 536 by controlling the spin speed of the individual mirrors 530 and 532 causes the above-mentioned interleaving patterns for hiding the effect of burned out, misdirected, or marginally operating light-emitting sources that would otherwise result in a degraded projected image. In the first preferred embodiment of the present invention, it should be noted that the spin speeds of the individual mirrors 530 and 532 are not integer multiples of each other and the difference from an integer multiple impacts interleaving.

From the foregoing, it should be understood by those skilled in the art that by controlling the spin speed of the polygon mirrors 530 and 532, the super pixel 512 can be controlled to move across the screen S on a first axis and then on a second axis such that the super pixel 512 is repetitively swept across every addressable location on a viewing screen S in a randomized manner as best seen in FIGS. 2A and 2B. FIGS. 2A and 2B illustrate how the super pixel 512 moves in such a manner to cause a single dot of light produced by an individual one of said plurality of light emitting sources 522 to overwrite the entire two-dimensional plane of the viewing screen S to produce an image that hides errors due to burned out individual ones of said plurality of light emitting sources. The sweeping action also results in interleaved and staggered scan patterns that further hide the effect of burned out, misdirected, or marginally operating light-emitting sources that would otherwise result in a degraded projected image.

In order to properly address individual pixel locations on the viewing screen S, the projector controller 536 must control the time on and time off values for each of the light emitting diodes in the diode array 522 relative to the rotational speed of the horizontal scanner 530 and the vertical scanner 532. Various errors affect the relative locations of the pixels and in particular the relative alignment of the light spots generated by the individual diode elements. To take care of these errors, alignment is performed by adjusting the timing of a given spot using a charged coupled device 542 and alignment electronics 544 forming part of the projector controller 536.

In order to correct for the various errors mentioned earlier, the alignment electronics 544 provides an indication of when a light beam generated by any individual one of the plurality of light sources 522 should arrive at any one of the addressable pixel locations on the viewing screen S. However, since the viewing screen S is incapable of generating a signal when the light beam illuminates the screen S, the charge-coupled device 542 is positioned to detect the light beam when it illuminates the screen S. In this regard, when the charge-coupled device 542 detects a spot of light on the screen S at a predetermined one of the addressable pixel locations on the screen S, the charge-coupled device 542 generates a beam detection signal. The beam detection signal is coupled to the alignment electronics 544, which in turn, stores the detection signal in the form of a detection code that includes a header code indicative of a pixel address location on the screen S that was illuminated by the light beam and a time code indicative of the time the detection signal was sensed and stored by the alignment electronics. The pixel address location is in the form of x and y coordinate values that define each and every pixel location on the screen S.

In response to the alignment electronics 544 storing the detection code, the projector controller 536 retrieves the detection code and compares it with a pre-stored alignment code that is indicative of when the beam of light generated by the projector 510 should have illuminated the addressable pixel location on the screen S. In this regard, the projector controller firmware first checks the x-coordinate values and then the y-coordinate values for alignment. In the first instance if there is a comparison between the x-coordinate values and time values between the two codes, the projector controller firmware proceeds to check the y-coordinate values for alignment. However if there is not a proper comparison between the x-coordinate values and time values, the projector controller 536 determines the differences between the two codes and makes an adjustment to the x-scanner 530 by either increasing or decreasing its rotational speed or by altering the timing of when the individual light sources or LEDS are turned on and off.

The projector controller 536 then retrieves a new detection code (for the same predetermined screen location) and repeats the x-coordinate alignment procedure as previously discussed. This is an iterative process until the two codes compare relative to the x-coordinate values and the time values.

Once there is an exact comparison, the firmware in the projector controller 536 proceeds to make a comparison between the y-coordinate values and time values between the two codes. If the projector firmware determines that there is a comparison, the projector controller generates another light beam for another predetermined addressable pixel location on the viewing screen S and then repeats the above described alignment procedure. However if there is not a proper comparison between the y-coordinate values and time values, the projector controller 536 determines the differences between the two codes and makes an adjustment to the y-scanner 532 by altering when individual light sources are turned on and off.

The projector controller 536 generates another light beam for the same predetermined addressable pixel location on the viewing screen S. The projector controller 456 then retrieves a new detection code (for the same predetermined screen location) and repeats the y-coordinate alignment procedure as previously discussed. This is an iterative process until the two codes compare relative to the y-coordinate values and the time values.

Once there is a complete comparison between the two codes, the projector controller 536 generates another light beam for a new addressable light source. The above-described procedure is then repeated until each and every addressable light source and been aligned with respect to the remaining individually addressable light sources.

While the present invention has been particularly shown and described with reference to the foregoing preferred embodiments, those skilled in the art will understand that many variations may be made therein without departing from the spirit and scope of the invention as defined in the following claims. For example, two methods of alignment have been described, one with external factory alignment hardware and one with an internal alignment arrangement. In this regard, other alignment arrangements are contemplated within the true scope and spirit of the present invention. In this regard, the beam positioning electronics 536 are capable of selectively causing individual ones of the plurality of light beams generated by the light sources 520 to be activated and directed to each and every addressable pixel location or to sub-pixel (locations between pixels) on the viewing screen S. Computational electronics within the control electronics 536 is responsive to the beam positioning electronics and to the charge couple device 542 in order to generate alignment information. The alignment information in turn, is stored in storage electronics 552. The alignment information may then be retrieved for selected individual ones of the light emitting sources 522 which have been directed at specific one of the addressable pixel locations on the screen S to facilitate relative alignment adjustment between the selected individual one of the plurality of light beams directed to a specific one of the addressable pixel locations and other selected individual ones of the plurality of light beams directed to the same specific one of the addressable pixel locations for alignment purposes. Therefore, the foregoing embodiments are illustrative, and no single feature, procedure or element is essential to all possible combinations that may be claimed in this or a later application. Moreover, the description of the invention should be understood to include all novel and non-obvious combinations of elements described herein, and claims may be presented in this or a later application to any novel and non-obvious combination of these elements. Where the claims recite "a" or "another" element or the equivalent thereof, such claims should be understood to include incorporation of one or more such elements, neither requiring nor excluding two or more such elements.

I claim:

1. A projector for casting an image onto a viewing surface defined by a matrix array of M by N individually addressable pixel locations, said projector comprising:
   a light engine for generating a super pixel of individual ones of a plurality of light beams; and
   a scanning arrangement for causing individual ones of said plurality of light beams to form light spots that move across a viewing surface on a first axis to define image lines along said first axis and for causing individual other ones of said plurality of light beams to form light spots to be interleaved with the image lines to hide the effect of burned out individual ones of said plurality of light-emitting diodes;
   whereby each individual one of said plurality of light beams overwrite every individual one of the addressable pixel locations in the matrix array of M by N individually addressable pixel locations.

2. A projector for casting an image onto a viewing surface defined by a matrix array of M by N individually addressable pixel locations, said projector comprising:
   a light engine for generating a super pixel of individual ones of a plurality of light beams; and
   a scanning arrangement for causing each individual one of said plurality of light beams to overwrite every individual one of the addressable pixel locations in the matrix array of M by N individually addressable pixel locations;
   wherein said scanning arrangement includes a horizontal scanning arrangement and a vertical scanning arrangement;
   wherein said horizontal scanning arrangement causes individual ones of said plurality of light beams to form light spots that move across the viewing surface on a first axis to define image lines along said first axis; and
   wherein said vertical scanning arrangement causes other light beams to form other light spots to be interleaved with the image lines to hide the effect of burned out individual ones of said plurality of light-emitting sources.

3. The projector according to claim 2, further comprising:
   a light sensor for detecting the individual ones of said plurality of light beams on the viewing surface;
   an alignment arrangement responsive to said light sensor for adjusting said scanning arrangement to cause each individual one of said plurality of light beams to overwrite every individual one of the addressable pixel locations.

4. The projector according to claim 3, wherein said alignment arrangement includes:
   beam-positioning electronics for selectively causing individual ones of said plurality of light beams to be directed at every individual one of the addressable pixel locations on the viewing surface;
   computational electronics responsive to said beam-positioning electronics and to said light sensor for generating alignment information;
   information storage electronics coupled to said computational electronics for storing the alignment information; and
   wherein said scanning arrangement includes control electronics for retrieving the alignment information for a selected individual one of said plurality of light beams directed at a specific one of the addressable pixel locations on the viewing surface to facilitate relative alignment adjustment between said selected individual one of said plurality of light beams directed to said specific one of the addressable pixel locations and other selected individual ones of said plurality of light beams directed to said specific one of the addressable pixel locations.

5. The projector of claim 2, wherein said light engine includes a m by n matrix array of light emitting sources.

6. The projector of claim 5, wherein said m by n matrix array of light emitting sources is a m by n matrix array of light emitting diodes.

7. An error correction system, comprising:
   scanning optics including first axis scan optics and second axis scan optics to cover a two-dimensional plane with light produced by a plurality of light-emitting sources having their intensities varied in accordance with an image; and
   control electronics responsive to said scanning optics for automatically adjusting said scanning optics so that a single dot of light produced by an individual one of said plurality of light-emitting sources overwrites said two-dimensional plane so that said image is a compensated image hiding errors due to burned out individual ones of said plurality of light-emitting sources.

8. A projector, comprising:
   a plurality of light-emitting sources, wherein each light emitting source generates a spot on a viewing surface; and
   a spot scanning apparatus that induces scanning of each of the spots across the viewing surface, the scanning apparatus is operative to overlap spots generated by different light emitting sources to hide errors induced by reduced intensity light emitting sources.

9. The projector according to claim 8, further comprising:
   information storage electronics;
   a light engine including said plurality of light emitting sources;
   control electronics that control the light-emitting sources to enable the light emitting sources to form spots on said viewing surface; and
   sensor and computational electronics that receive signals from the multiple light emitting sources and generate alignment information and store the alignment information on the information storage electronics, wherein the information storage electronics utilizes the alignment information to provide relative alignment between the spots on the viewing surface.

10. The projector according to claim 8, wherein said spot facilitates the displaying of a super pixel on a said viewing surface.

11. The projector according to claim 10, wherein said super pixel is a rectangular shaped super pixel arranged in an n by m array.

12. The projector according to claim 10, wherein said super pixel Is a circular pixel.

13. The projector according to claim 10, wherein said super pixel is an irregularly shaped pixel.

14. The projector according to claim 10, wherein said super pixel has a polygon shape.

15. The projector according to claim 10, wherein said super pixel has a triangular shape.

* * * * *

UNITED STATES PATENT AND TRADEMARK OFFICE
CERTIFICATE OF CORRECTION

PATENT NO. : 7,148,933 B2
APPLICATION NO. : 10/349047
DATED : December 12, 2006
INVENTOR(S) : Winthrop D. Childers It is certified that error appears in the above-identified patent and that said Letters Patent is hereby corrected as shown below:

In column 14, line 57, in Claim 12, after "super pixel" delete "Is" and insert -- is --, therefor.

Signed and Sealed this

Twentieth Day of January, 2009

JON W. DUDAS
*Director of the United States Patent and Trademark Office*